Inventor:
Robert E. Hartsock,
by Gordon Needleman
Att'y.

Dec. 13, 1966 R. E. HARTSOCK 3,291,925

MULTIPLE CIRCUIT SELECTOR SWITCH

Filed May 27, 1965 3 Sheets-Sheet 2

Inventor:
Robert E. Hartsock,
by Gordon Needleman,
Atty.

Dec. 13, 1966    R. E. HARTSOCK    3,291,925

MULTIPLE CIRCUIT SELECTOR SWITCH

Filed May 27, 1965    3 Sheets-Sheet 3

Inventor:
Robert E. Hartsock,
by Gordon Needleman
Att'y.

United States Patent Office 3,291,925

Patented Dec. 13, 1966

3,291,925

MULTIPLE CIRCUIT SELECTOR SWITCH

Robert E. Hartsock, La Habra, Calif., assignor to United-Carr Incorporated, Boston, Mass., a corporation of Delaware Filed May 27, 1965, Ser. No. 459,370
5 Claims. (Cl. 200—46)

This invention relates generally to multiple circuit selector switches and more specifically to a card controlled switch.

An object of the present invention is to provide a simple and compact multiple circuit selector switch.

A further object of the invention is to provide a multiple circuit selector switch in which the external terminations are fixed in position and suitable for plug-in connection.

A still further object of the present invention is to provide a multiple circuit selector switch which utilizes the spring action of a multiplicity of resilient contacts to assist the switching operation.

Another object of the present invention is to provide a multiple circuit selector switch which utilizes spring contacts and a punched card to determine the resulting circuits.

Still another object of the present invention is to provide a multiple circuit selector switch having terminals or pads formed in a way which allows making combinations of the circuits without extensive re-building or supplementary wiring.

Other objects of the invention will, in part, be obvious and will, in part, appear hereinafter.

Figure 1:
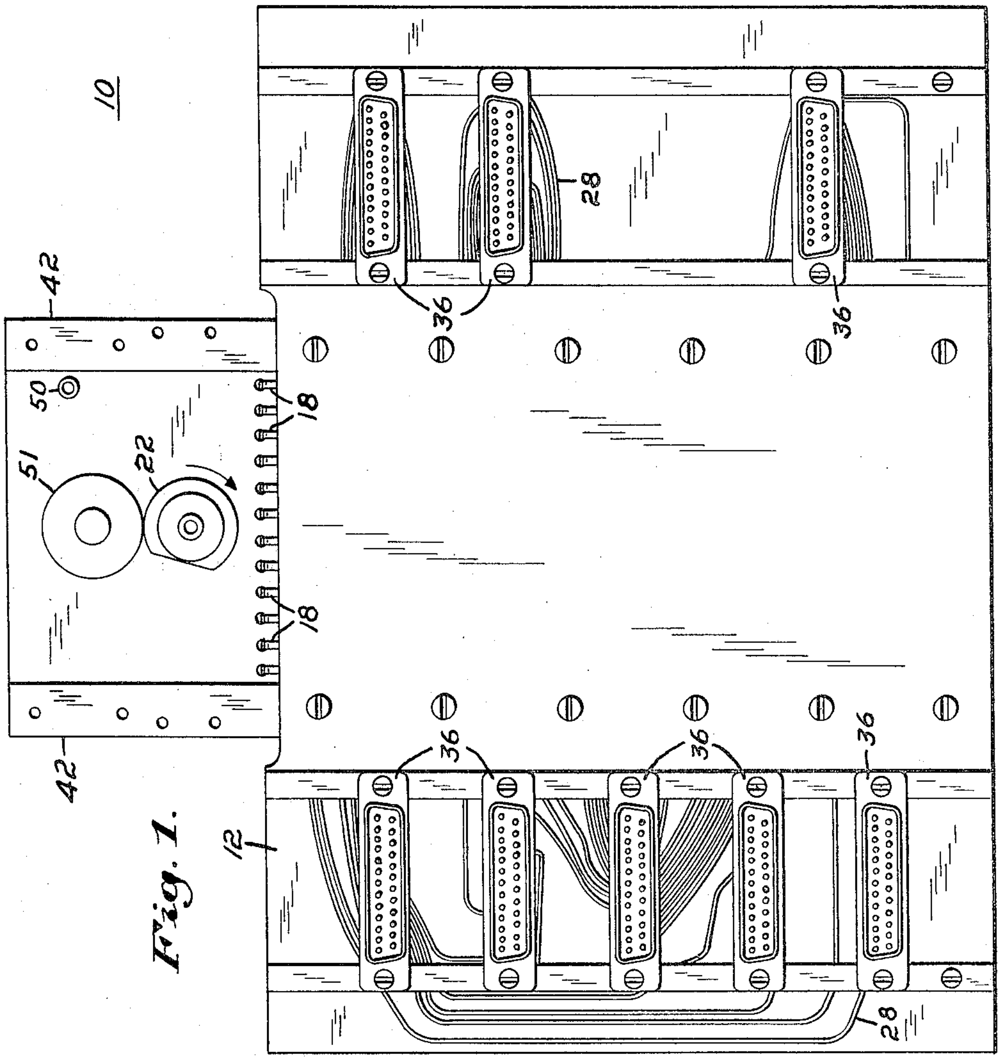
FIG. 1 is a top plan view of the multiple circuit selector switch.

One of the greatest problems which arises in the use of complex electrical or electronic equipment is to quickly test such a mechanism, and discover specific problem areas. An early method of testing used patch cord panels which required frequent rearrangements of leads every time the item being tested was changed. This obviously led to frequent errors. A solution to the loss of time and possibility of error is the use of patch cord panels which are completely wired for some inspection sequence. Extremely elaborate and cumbersome systems resulted from this approach.

In order to avoid the disadvantages of a patch cord panel, systems utilizing punched cards have come into vogue. Many of these provide pin and socket arrangements to make the necessary connections. The pins are pushed against the punched card, where a pin strikes the card, it creates an electrical connection but where the card has a hole location at that point, the pin striking the hole location will be forced through the hole, thereby not making electrical connection. This system has numerous disadvantages although it is more efficient than the patch cord panel system. Although the cards are formed of fairly tough material, such as "Mylar," continued use in a pin and socket system will lead to ruptures or damage to the card. In addition, the mechanism used to move the pins into position and the necessity of having the pins of substantial length, produces a bulky switch.

The present invention avoids the disadvantages of both the patch cord system and the pin and socket system. It can be made extremely compact, and uses a very simple flexible contact which in multiple units provides its own force for completing the pad or terminal engaging cycle.

There is shown a multiple circuit selector switch 10 comprising, in general, an input board 12, a first guide panel 14, an actuator panel 16, a multiplicity of resilient contacts 18, a motor 20 having a cam mechanism 22 associated therewith, a second guide panel 24 and an output board 26. The input board 12, the guide panels 14, 24, the actuator panel 16 and the output board 26 are held in a stacked arrangement with the actuator panel 16 movable in relation to the other elements while they remain in fixed relation to each other.

More specifically the input board 12 includes an upper surface having a grid 28 of printed or etched circuitry and having a series of primary holes 30 formed therethrough. The walls of the holes 30 are coated with a conductive material which joins the grid 28 at predetermined points. This conductive material is continued on the opposite surface of the board adjoining each of the holes 30 to provide a contact pad 34. The pattern of the holes 30 in the central portion of the grid match those of a card 32, which will be more fully described hereinafter.

A series of plugs 36 are engaged with the upper surface of the input board 12. The plugs 36 may be permanently mounted to the board on a series of spaced bars as shown in FIG. 1. The upper central portion can be protected by a covering panel 38. The first guide panel 14 has holes 15 of the same pattern as the central portion of the input board 12 but without the circuitry and is placed into position under the input board 12. The first guide panel 14 is spaced from the input board by a pair of shims, which run from side to side, creating a card slot 40.

The actuator panel 16 is a rectangular panel without circuitry slightly greater in width than the central portion of the input board 12 and having the same hole pattern formed thereon.

The contacts 18 are formed of flat, resilient beryllium copper each of whose terminal ends are bent back upon themselves to provide arced engagement surfaces. The contacts may also be formed from a resilient wire, having soldered or headed terminal ends or may be formed of a spring, such as a compression spring, whose terminal ends are soldered to provide a pad contacting surface.

Figures 2, 3, 4:
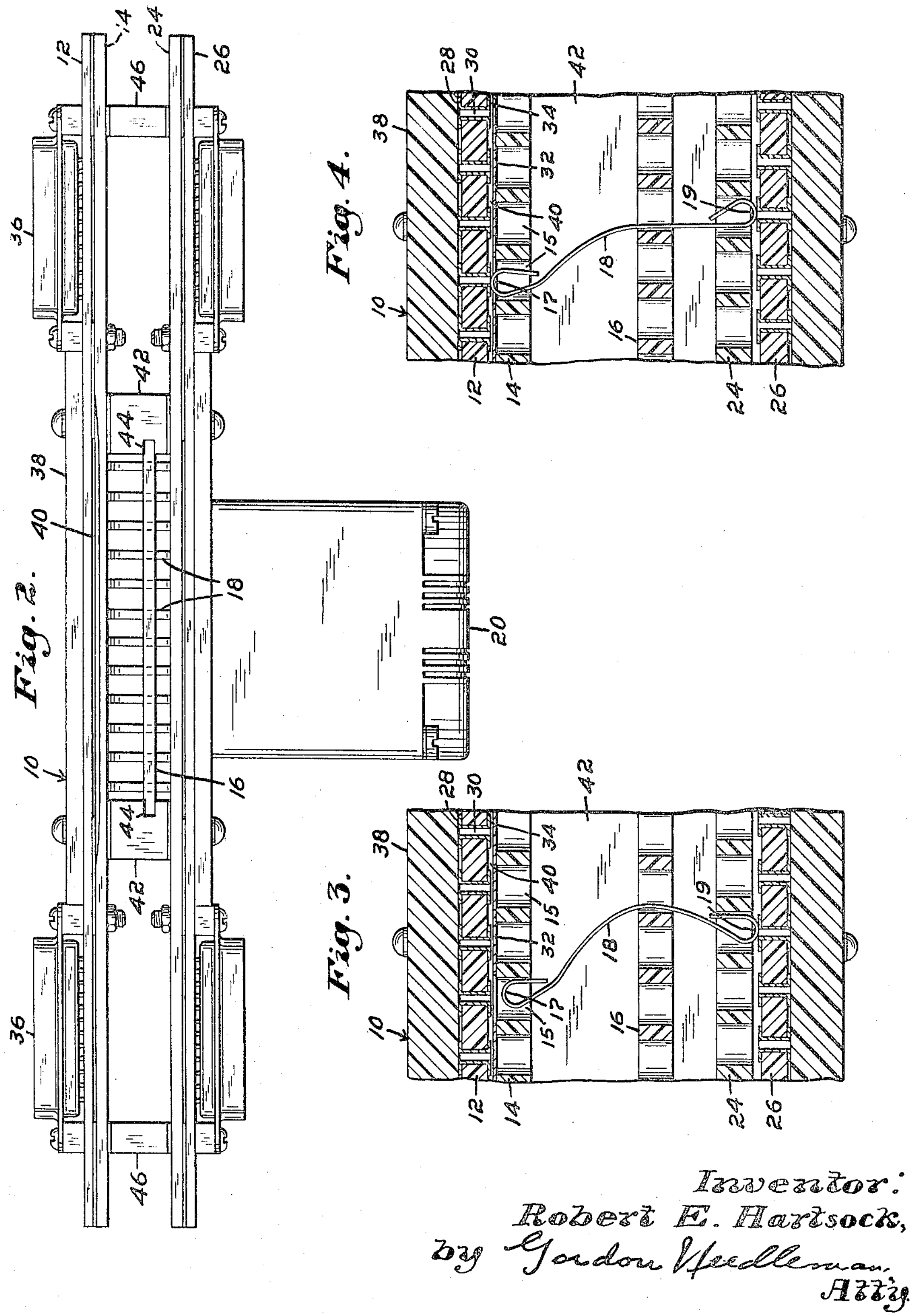
FIG. 2 is a side elevation of the switch shown in FIG. 1.
FIG. 3 is a cross section of the median portion of the switch showing the contact disengaged.
FIG. 4 is a figure similar to FIG. 3 showing the contact engaged.

A pair of rails 42 having a rectangular slot 44 formed on a surface thereof, in which the actuator panel 16 will ride, is attached to the first guide panel 14 in a manner which places the actuator panel 16 in spaced relation to it. The actuator panel 16 can now be moved along the rectangular slots 44. One contact 18 is placed in each hole of the actuator panel 16. The second guide panel 24 which is similar in all respects to the first guide panel 14 is then attached to the bottom of the rails 42 in offset relation to the first guide panel 14. A pair of spacer bars 46 may be utilized to provide sufficient rigidity to the attachment of the two guide panels 14, 24. The contacts 18 are now fixed in position one terminal end, the input terminal end 17, lying in a hole formed in the first guide panel 14 and the other, the output terminal end 19, lying in a corresponding hole in the second guide panel 24. As a result of the offset relationship the length of the input terminal end 17 to the actuator panel 16 is greater than the length from the output terminal end 19 to the actuator panel 16. The output board 26 is then added to the assembly, either in abutting or spaced relation to the second guide panel 24. Here the surface with the circuitry is placed on the surface facing away from the assembly. In this case, the circuit connections may be different from that of the input board 12. The total assembly can be held together by screws as shown by the drawing at FIGS. 1 and 2. Plugs are tied into the circuits in a manner similar to that utilized on the input board 12. The switch can be driven with a motor 20 and cam mechanism 22. In automatic testing equipment for electrical gear this switch can select variables such as signals or loads and voltages. This use is demonstrated in a tube tester where different combinations of voltages and loads are needed for each tube tested. The switch may also be used in teaching machines and in automated equipment such as is found in processing plants or the like.

The multiple circuit selector switch 10 as described hereinbefore operates in the following manner. Electrical signals or impulses are fed into the plugs of the circuit board, through the printed circuitry of the boards and down to the pads 34 on the opposite face of the board. A card 32 is inserted into the area between the input board 12 and the first guide panel 14. This card 32 has holes punched in it which correspond to selected pads on the input board 12 and corresponding holes in the first guide panel 14. In order to insert the card 32 in the switch, the switch must be in a cocked position. This is brought about by having the actuator panel driven by its motor 20, against the contacts 18 pulling the input terminal ends 17 away from the input board 12. The offset relation of the first and second guide panels 14, 24, fixes the movement of the output terminal ends 19, and this allows greater movement and lengthening, from the bowed position of the input terminal ends 17. This arrangement could be reversed, if desired. Any method of trapping the terminal end of the contacts 18 may be used, such as soldering for example. Since it is desirable to have a wiping action of the terminals of the contacts it is better, as in the exemplification disclosed in the drawings, to use the offset relation which produces a rolling action of the output terminal ends 19, thereby producing a wiping action. In this open position the input terminal ends 17 are pulled against the wall of their holes 15 in the first guide panel 14. The cam 22 is so designed as to provide overtravel on the part of the actuator panel thereby assuring that all of the input terminal ends 17 are lifted from their pads sufficiently to allow the insertion of a card. To permit the spring action of each contact individually to force itself into engagement with its pad, the motor 20, after the card 32 has been inserted, relaxes its force allowing the spring action of the contacts 18 to take over. At first, the contacts 18 lengthen allowing them to strike available individual pads. They will then slide across the pad due to the clearance in the holes formed in the first guide panel producing a wiping engagement. Of course, in the circumstances that there is no hole in the card, then this action will take place on the card and no electrical connection is made. The operator of the instrument involved is now ready to take the readings.

Figure 5:
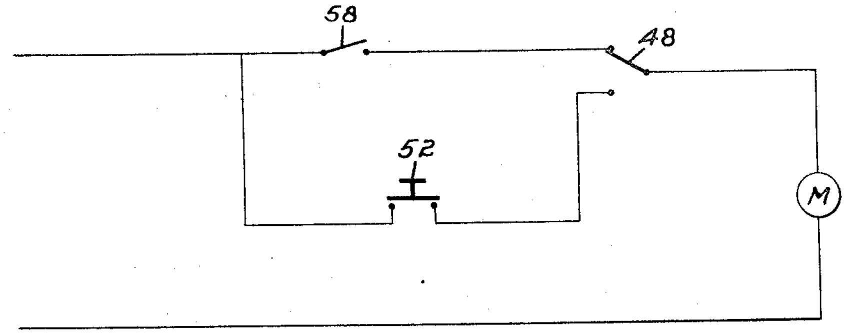
FIG. 5 is a diagram showing control switches ready to react to insertion of a card.
Figure 6:
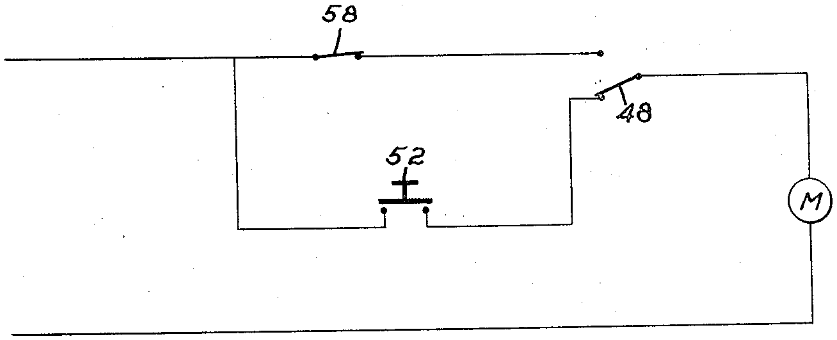
FIG. 6 is a diagram showing control switches ready to react to manual release.

The electrical circuitry of the operation of the multiple switch may be best described by starting in a position where the switch is ready to accept a card and the spring contacts are clear of the pads. The limit switch 48 is located on a frame attached to the rails 42 and in spaced relation to a tubular actuator element 50 which is in right angle relationship to the actuator panel 16. The limit switch 48 comprises a pair of switches which are in this particular point in time in what may be referred to as an actuated position. See FIG. 5.

When a card is fully inserted a card micro-switch 58 is closed starting the motor through the closed contacts of the limit switch 48. The cam member 22 moves a slight distance and the cam 22 and the follower 51 starts into what may be referred to as the valley of the cam member 22. This releases the pulling force of the motor against the actuator panel and the stored up spring tension in each contact 18 is released so that the actuator panel 16 is pulled forward and the input terminal ends 17 make their programmed engagement almost simultaneously with the movement of the actuator panel 16. The actuator element 50 releases its engagement from the limit switch 48 which returns to a normal position removing power from the motor.

To open the switch and retrieve the card, the release button is pressed and the release switch 52 completes the circuit starting the motor through the limit switch 48. This brings all of the spring contacts 18 into a cocked position (i.e., pulls the input terminal ends 17 away from a making position on the pads 34). At a predetermined point the actuator element 50 trips the limit switch 48 stopping the motor, the follower 51, and its associated cam member 22. Prior to the point where the actuator element 50 trips the limit switch the card is loose enough so that the spring contact of the card micro-switch 58 can push the card away from engagement, thereby opening up that portion of the circuit. The follower 51 is stopped at the top of the arc of the cam member 22. The old card 32 can now be removed and a new card inserted.

Since certain other obvious modifications may be made in this device without departing from the scope of the invention it is intended that all matter contained herein be interpreted in an illustrative and not in a limiting sense.

I claim:

1. A multiple circuit selector switch having an input board, first guide panel, an actuator panel, a second guide panel and an output board all in stacked relationship, said output board and said input board having printed circuitry on one surface and a series of contact pads on the other surface, said contact pads arranged in a predetermined pattern and electrically connected to said printed circuitry of their respective boards, a series of apertures formed through said first and second guide panels and said actuator panel, the pattern of said apertures corresponding to the pattern of said contact pads, a series of contacts each having a first terminal end and a second terminal end and having a portion between said first and second terminal ends lying within the area of one of said apertures formed in said actuator panel each of said first terminal ends lying within the area defined by one of said apertures formed in said first guide panel and each of said second terminal ends lying within the area defined by one of said apertures formed in said second guide panel and means for moving said actuator panel transversely of the first and second guide panels and in parallel relationship thereto whereby a predetermined series of said first terminal ends make and break contact with selective contact pads formed on said first guide panel.

2. A multiple circuit selector switch actuating mechanism comprising a first guide panel, having a series of apertures formed therethrough, a second guide panel, having a series of apertures formed therethrough, an actuator panel, having a series of contact apertures formed therethrough, and a series of contacts, each of said contacts having first and second terminal ends and having a portion between said terminal ends lying within the area defined by its respective contact aperture and each of said first terminal ends lying within the area defined by its respective aperture formed in said first guide panel and each of said second terminal ends lying within the area defined by its respective aperture formed in said second guide panel and said first and second guide panels in spaced, stacked relationship with said actuator panel lying between said first and second guide panels and said actuator panel having a drive means associated therewith adapted to move said actuator panel transversely of said first and second guide panels thereby bending said contacts formed a relaxed to a tensioned position.

3. A multiple circuit selector switch actuating mechanism as set forth in claim 2 wherein said first guide panel and said second guide panel are in fixed offset relationship and said drive means comprising a motor, a drive shaft and a cam and a follower, said cam cooperating with said follower to move said actuator panel.

4. A multiple circuit selector switch as set forth in claim 1 wherein said actuator panel is associated with switch means adapted to be engaged by a punch card insertable in said multiple circuit selector switch thereby actuating said means for moving said actuator panel.

5. A multiple circuit selector switch as set forth in claim 4 wherein limit switch means is associated with said actuator panel and release switch means cooperates with said limit switch means to actuate said drive means after engagement of said contacts with said contact pads.

References Cited by the Examiner

UNITED STATES PATENTS

| | | | |
|---|---|---|---|
| 1,981,987 | 11/1934 | Bryce. | |
| 2,521,561 | 9/1950 | Batcheller | 200—16 |
| 3,156,793 | 11/1964 | Rosen et al. | 200—16 |

BERNARD A. GILHEANY, *Primary Examiner.*

T. D. MacBLAIN, *Assistant Examiner.*